(12) United States Patent
Smallhorn

(10) Patent No.: US 6,824,104 B2
(45) Date of Patent: Nov. 30, 2004

(54) UNDER FLOOR REMOTE SEAT CLUSTER AND INTEGRATED HOUSING SYSTEM FOR AIRCRAFT PASSENGER ENTERTAINMENT SYSTEMS AND THE LIKE

(75) Inventor: George R. Smallhorn, Montreal (CA)

(73) Assignee: Inflight Canada Inc., Quebec (CA)

(*) Notice: Subject to any disclaimer, the term of this patent is extended or adjusted under 35 U.S.C. 154(b) by 0 days.

(21) Appl. No.: 10/406,381

(22) Filed: Apr. 4, 2003

(65) Prior Publication Data

US 2004/0195446 A1 Oct. 7, 2004

(51) Int. Cl.$^7$ .............................................. B64D 11/06
(52) U.S. Cl. ............................. 244/118.5; 244/118.6; 244/1 R
(58) Field of Search .................. 244/118.5, 118.6, 244/1 R, 137.2; 105/345; 297/217.3

(56) References Cited

U.S. PATENT DOCUMENTS

| | | | | |
|---|---|---|---|---|
| 4,428,078 A | * | 1/1984 | Kuo ............................ | 455/3.06 |
| 5,024,398 A | * | 6/1991 | Riedinger et al. ........ | 244/118.5 |
| 5,555,466 A | * | 9/1996 | Scribner et al. ............... | 725/75 |
| 5,973,722 A | * | 10/1999 | Wakai et al. .................. | 725/76 |
| 6,058,288 A | * | 5/2000 | Reed et al. ................. | 455/3.06 |
| 6,145,926 A | * | 11/2000 | Lin .......................... | 297/217.3 |
| 6,194,853 B1 | * | 2/2001 | Tual et al. ................... | 318/266 |
| 6,249,913 B1 | * | 6/2001 | Galipeau et al. .............. | 725/76 |
| 6,619,588 B2 | * | 9/2003 | Lambiaso ................ | 244/118.5 |
| 2002/0070590 A1 | * | 6/2002 | Carstens .................. | 297/217.3 |

* cited by examiner

Primary Examiner—Peter M. Poon
Assistant Examiner—Timothy D. Collins
(74) Attorney, Agent, or Firm—Ogilvy Renault; Paul J. Field

(57) ABSTRACT

A remote cluster system for providing a number of passenger seats with passenger services within an aircraft passenger cabin. The cluster includes a motherboard, having a power input connection in communication with an aircraft electrical power source; a signal input connection in communication with an aircraft passenger seat services unit; a number of circuit board slots in communication with the power input connection and signal input connection; and a number of passenger seat output connectors, each output connector communicating with at least one of the circuit board slots. A number of circuit boards are each removably engaged in an associated circuit board slot of the motherboard and passenger seat service cables communicate between the passenger seats and each passenger seat output connector. Preferably, each passenger seat has a dedicated passenger seat output connector, a dedicated passenger seat service cable and a dedicated circuit board to accommodate passenger service upgrades and simplify maintenance troubleshooting.

32 Claims, 14 Drawing Sheets

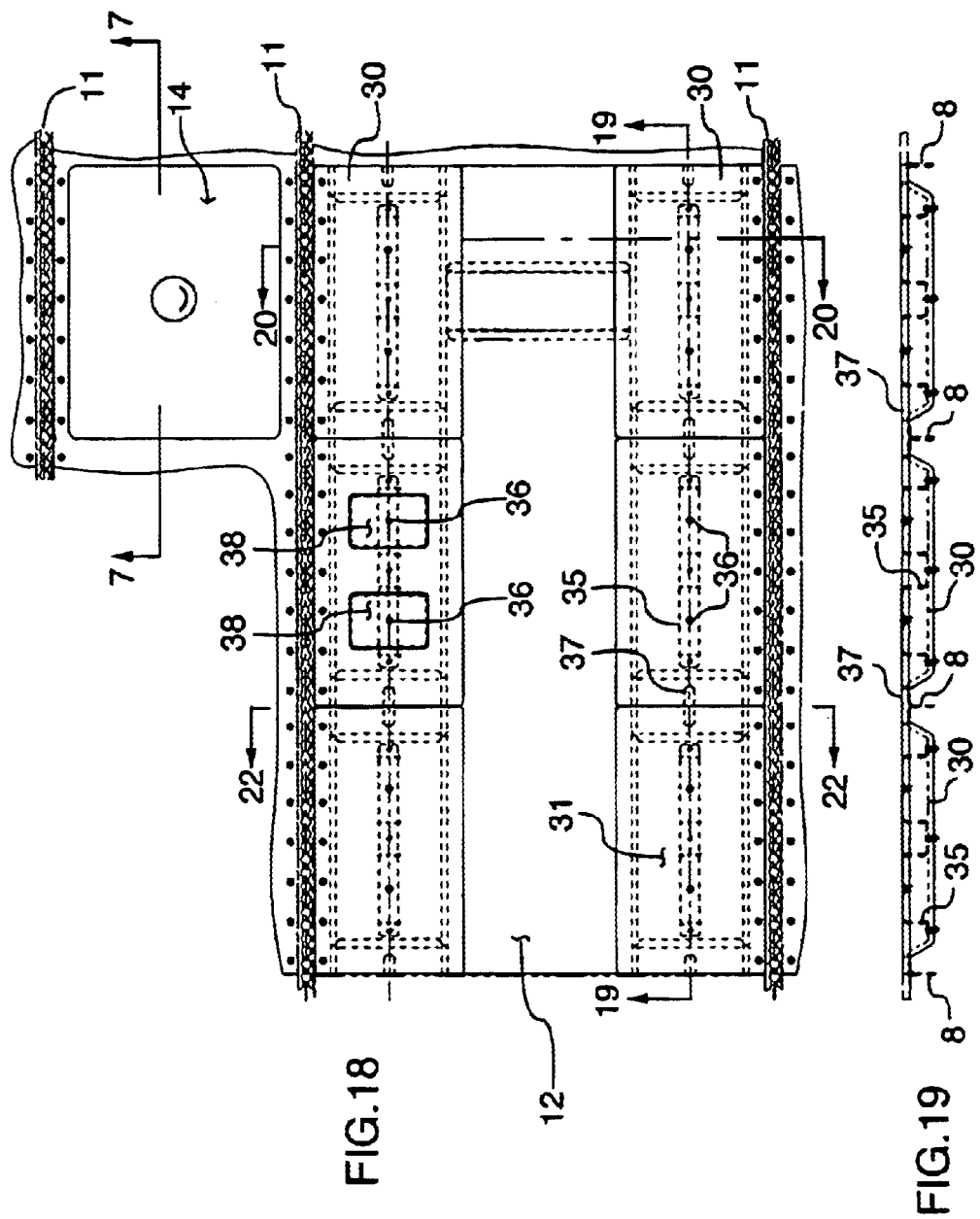

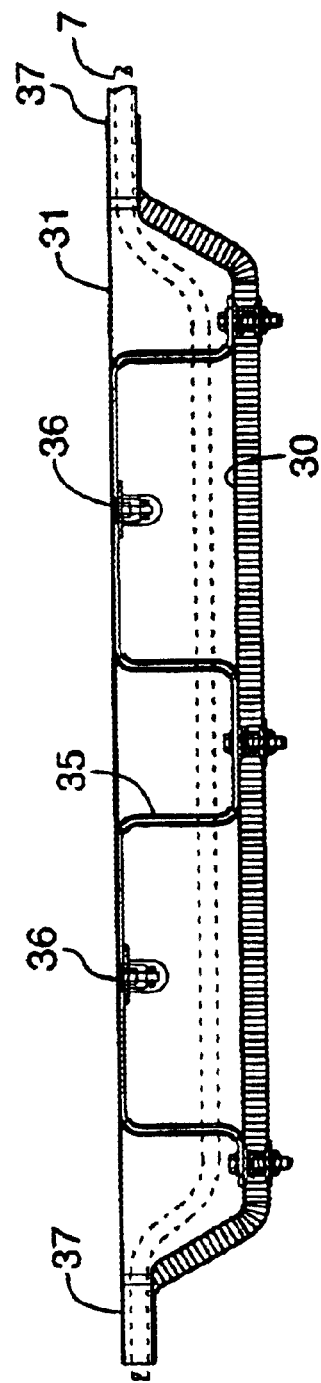
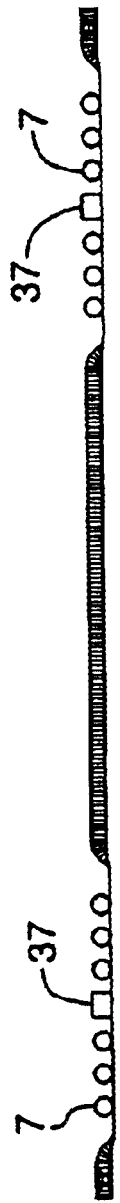
FIG.21
FIG.22

UNDER FLOOR REMOTE SEAT CLUSTER AND INTEGRATED HOUSING SYSTEM FOR AIRCRAFT PASSENGER ENTERTAINMENT SYSTEMS AND THE LIKE

TECHNICAL FIELD

The invention relates to a remote seat cluster in an air cooled under floor housing to provide passenger entertainment, voice and data communication, seat actuation and electric power supply for passenger operated devices.

BACKGROUND OF THE ART

As described in the applicant's co-pending patent application PCT/CA02/01858, an increasingly important component of passenger aircraft cabin services is the provision of individualized audio/video entertainment systems, voice and data communications, and electric power for operating laptop computers and personal entertainment devices. Passengers are normally required to remain seated for extended periods and for optimum safety, the passengers should remain seated with safety belt fastened during a flight. To improve service, airlines provide various passenger operated services such as audio and video entertainment, telephone, intercom, television, video games, internet, email and electrical power supply for laptop computers and personal electronic devices, and especially in business class and first class areas advanced controls for seat positioning and seat comfort controls.

The airlines have responded to passenger's expectations and attempted to improve passenger service by providing seat controls, entertainment and communication services in existing aircraft and in new aircraft as they are purchased. Due to the confines of existing aircraft cabins and seating arrangements, it has been considered necessary to fit passenger seat units with entertainment and communication system electrical boxes or other passenger systems electrical boxes that are currently mounted to the seat legs under the seat.

The conventional location of these bulky digital system electrical boxes in the under seat hand luggage area has several disadvantages, that are partly alleviated by the under floor housing and raceway system described in the applicant's co-pending patent application PCT/CA02/01858. The installation of electrical equipment in an under floor housing reduces the risk of injury and potential electrical shock, as well as exposure of the electrical equipment to potential accidental impact damage, vandalism, foreign matter ingestion into cooling fans and spilled beverages served within the passenger cabin. The housing of electrical boxes under floor provides a less cluttered cabin and the flat floor design does not interfere with cleaning of the passenger cabin nor expose electronic units to potential damage from vacuum cleaners and cleaning solvents used during the cleaning of carpets and passenger seats.

The prior art merely provides for relocating existing passenger service components in an under floor air cooled housing but does not address the disadvantages of the components themselves, only their location. The existing components are less than optimal in terms of power consumption, capacity to serve multiple seats, overall cost, bulk, and ease of initial installation, retrofitting, service upgrades and maintenance.

It is an object of the present invention to rationalize the configuration of passenger service electronics within the passenger cabin, reduce the size, complexity and electric power demands and stow any electrical components safely in an isolated environment away from passenger contact that may cause accidental or intentional damage.

It is a further object of the invention to integrate passenger seat services, audio, video, electric power, voice and data communication electronics and conduits into hidden under floor housings and raceways within floor panels or suspended under the removable floor panels of the passenger cabin floor.

It is a further object of the invention to provide adequate temperate control and cooling for the passenger seat service components.

It is a further object of the invention to minimize the expense and down time required to modify existing aircraft equipment without requiring extensive modification to the aircraft or requiring the aircraft to be out of service for extended periods of time.

Further objects of the invention will be apparent from review of the disclosure, drawings and description of the invention below.

DISCLOSURE OF THE INVENTION

The invention provides a remote cluster system for providing a number of passenger seats with passenger services within an aircraft passenger cabin. The cluster includes a motherboard, having a power input connection in communication with an aircraft electrical power source; a signal input connection in communication with an aircraft passenger seat services unit; a number of circuit board slots in communication with the power input connection and signal input connection; and a number of passenger seat output connectors, each output connector communicating with at least one of the circuit board slots. A number of circuit boards are each removably engaged in an associated circuit board slot of the motherboard and passenger seat service cables communicate between the passenger seats and each passenger seat output connector. Preferably, each passenger seat has a dedicated passenger seat output connector, a dedicated passenger seat service cable and a dedicated circuit board to accommodate passenger service upgrades and simplify maintenance troubleshooting.

Dedicated circuit boards are preferred since faulty units can be easily identified and replaced. As well, simple exchange of a circuit board can upgrade services to a passenger seat to different services, memory capacity, resident software, or add services including: audio entertainment; video entertainment; telephone; intercom; television; video games; internet access; email; and electrical power supply for laptop computers or personal electronic devices. When an airline acquires used aircraft, the services can be easily modified, upgraded or repaired by replacing the dedicated circuit boards preferably without lifting floor coverings or even rewiring the passenger seats.

By combining passenger seat services in a remote under floor cluster, the cost and bulk of the electronic services is reduced considerably. Consolidating circuit boards on a motherboard enables simplification of the input power and signal connections, enables use of a single power source, and more efficient air cooling systems. The use of easily removable circuit boards in slots of the motherboard, with dedicated output connections and online LED indicator lights simplifies diagnosis of faults and permits rapid changing of malfunctioning circuit boards, with minimal downtime.

The complete under floor cluster housing system preferably includes a cooling air circulation system, temperature monitoring system, cooling fan rotation monitoring system and floor boards with integral cable raceways. The service life of electronic units, control of overheating and safety of operation are increased dramatically due to the monitoring of fan functioning and temperature during operation. The cooling fans operate in conjunction with the air circulation flow within the fuselage which generally draws air from the passenger cabin to exit the cabin through louvers in the cabin side walls adjacent the floor and then proceeds in the lower lobe of the fuselage to vent about 50% and recirculate the remaining 50% with fresh compressed air from the engine compressors. Therefore the positioning of recessed housings, with air cooling fans under the floor, draws in spent air that has exited the cabin and does not increase the heat input into the cabin. As well, the air cooled under floor housings do not require a dedicated air supply nor separate air coolers since the air conditioning system of the cabin has sufficient capacity and directs air flow to the under floor area of the fuselage.

Increased control over the temperature of the electrical system operation is provided by positive airflow through the under floor housings and temperature sensors. The sensors alert the cabin crew through displays on a control panel in the event of any malfunction.

Airlines can more easily add electronically delivered passenger services to relatively crowded economy sections of the cabin with far less difficulty since electronic components can be clustered on a single motherboard and stored in the under floor air cooled housings rather than in conventional under seat locations.

In addition, since it is necessary in a retrofit to remove and replace several floor panels, the invention can easily provide for a recessed cable raceway in floor panels or an under floor suspended raceway adjacent to the seat tracks to route conduits and cables to individual seats in a raceway. The advantage of an under floor or recessed raceway is that existing plastic seat track cover strips can be eliminated and the entire cabin floor can be provided with a flat flush carpeted surface. Existing seat track cover strips enclose cables beneath them and rise above the carpeted floor level as a result. Plastic seat track covers are sometimes referred to as "speed bumps" due to their appearance and impedance of pedestrian traffic. Use of a recessed cable raceway and flush carpeted floor over the cables and seat track removes a tripping hazard, simplifies cleaning of the floor surface, reduces maintenance of the floor surface and improves the visual appeal of the passenger cabin.

DESCRIPTION OF THE DRAWINGS

In order that the invention may be readily understood, embodiments of the invention are illustrated by way of example in the accompanying drawings.

FIGS. 1–16 relate to a recessed cable raceway that is suitable where the floor panels are not required as a diaphragm structural member to reinforce the floor beams and joists, as in Boeing™ aircraft for example.

FIGS. 17–22 relate to an alternative under floor raceway arrangement where the floor panels are used as a diaphragm structural member to reinforce the floor beams and joists, as in Airbus™ aircraft for example. In this case, the ability to include of cut-outs in the floor panels is more restrictive and in general, the high stress areas around the edges of the panels must remain intact for structural reasons limiting cut-out openings to the central low stress area of the floor panels.

FIG. 17 is a sectional view also along line 3—3 of FIG. 2 indicating an alternative orientation of the passenger cabin and floor with seating arrangement not shown, but rather showing an alternative longitudinal dual raceway with recessed housings branching off laterally from the two central longitudinal raceways.

FIG. 18 is a detailed plan view of a selected typical portion of the cabin floor shown in dashed outline in FIG. 17.

FIG. 19 is a sectional view along lines 19—19 of FIG. 18 showing a section of the raceway.

FIG. 20 is a sectional view along lines 20—20 of FIG. 18 showing the two raceways and a recessed housing beneath a removable top cover in the passenger cabin floor.

FIG. 21 is a sectional detailed view of one third of the view shown in FIG. 19.

FIG. 22 is a sectional view along lines 22–22 of FIG. 19.

Further details of the invention and its advantages will be apparent from the detailed description included below.

DETAILED DESCRIPTION OF PREFERRED EMBODIMENTS

Figure 1:
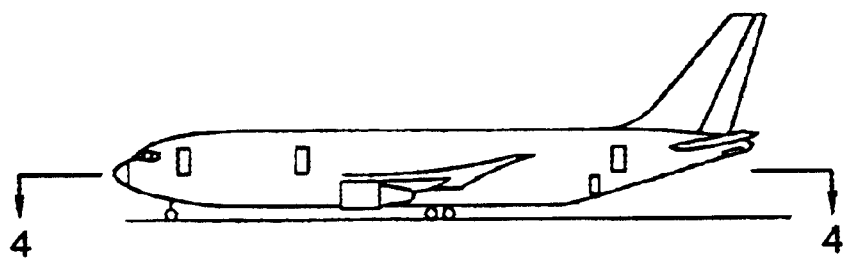
FIG. 1 shows a side view of a typical passenger aircraft to orient the following sectional views.
Figure 2:
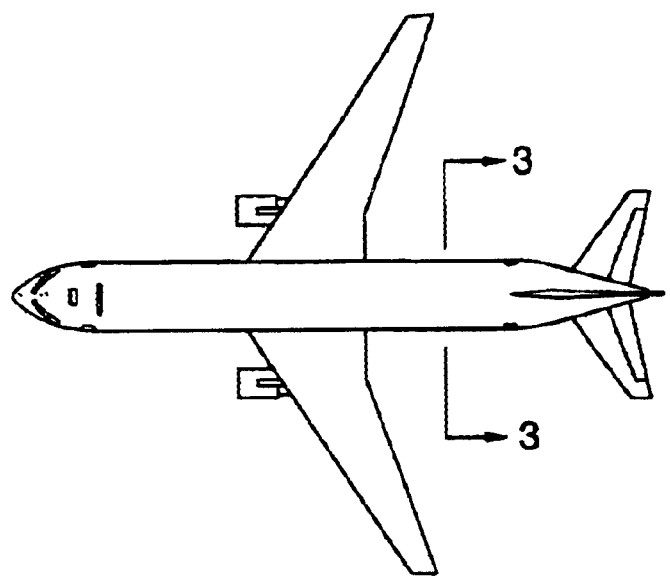
FIG. 2 shows a top plan view of the aircraft for the same reason.
Figure 3:
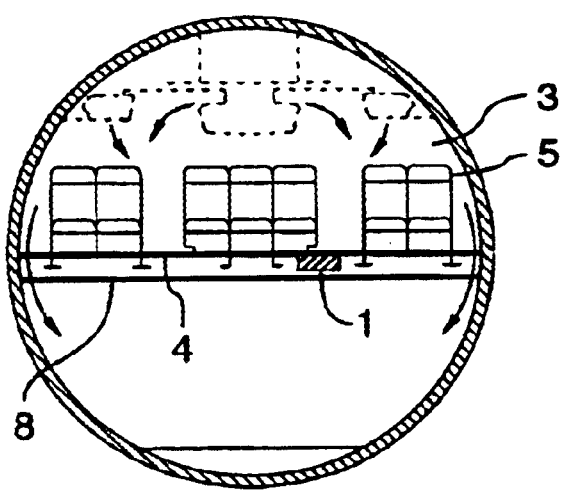
FIG. 3 shows a sectional view along line 3—3 of FIG. 2 indicating the orientation of the passenger cabin floor and a typical seating arrangement.
Figure 4:
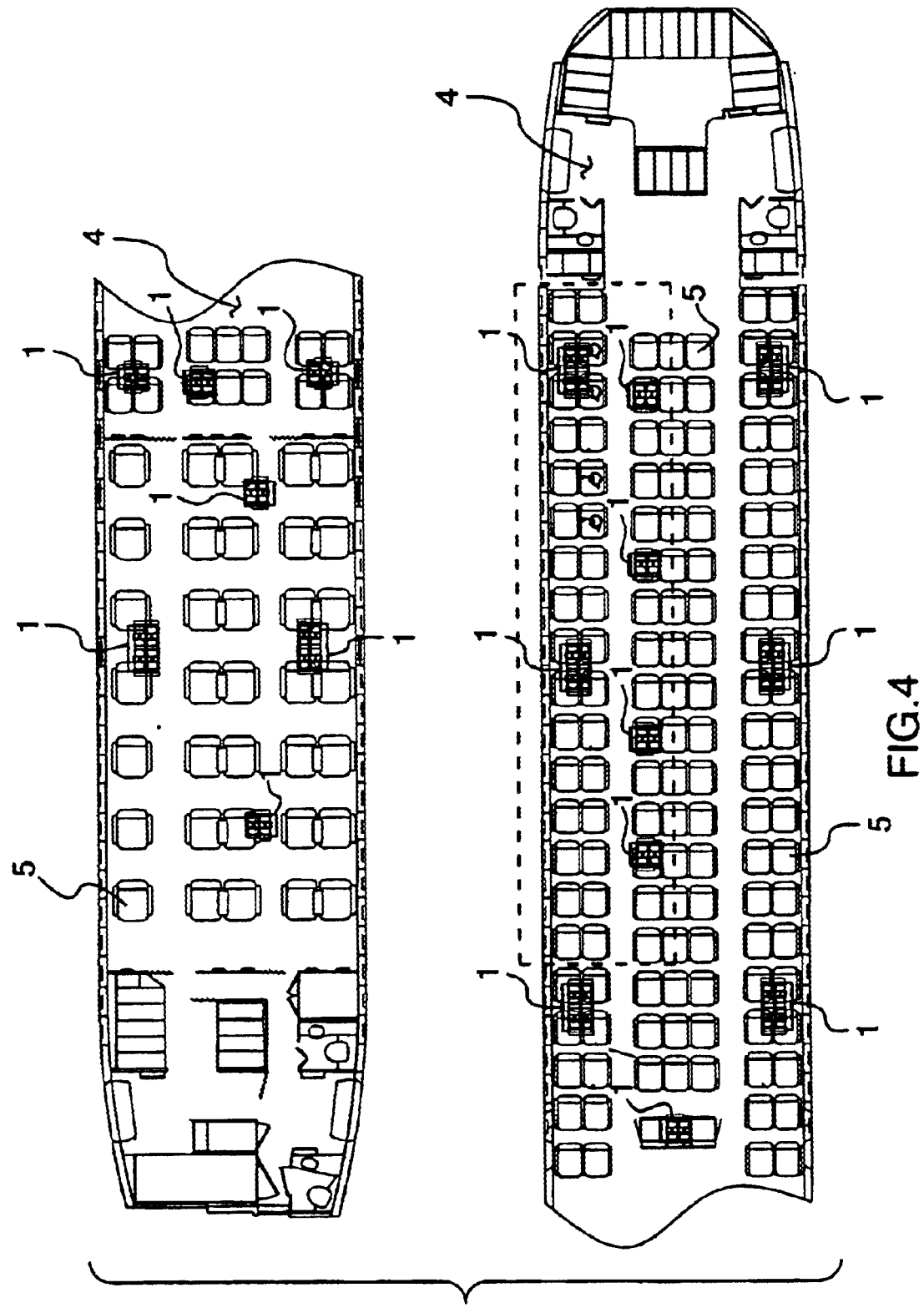
FIG. 4 is a sectional view along line 4—4 of FIG. 1 showing the passenger cabin floor plan and seating arrangement typically found in a wide body aircraft, and in particular showing the location of various under floor recessed housings providing compact accommodation for passenger seat service clusters in an under floor air cooled housing.

As mentioned above, FIGS. 1 and 2 are provided to orient the reader in quickly understanding the sectional view FIG. 3 and the floor plan of FIG. 4. A conventional aircraft passenger cabin floor 4, as indicated in FIG. 3, is supported on transverse floor beams 8 that in turn support longitudinal floor joists 10 with seat tracks 11 in their top flanges wherein seat legs can slide longitudinally and are locked in various seat pitch patterns as desired.

Pressurized air for the passenger cabin 3 comes from compressor stages in the aircraft engines. A portion of the hot compressed air is drawn off from the engine and passed through heat exchangers, then further cooled by air conditioning units under the floor 4 of the cabin 3. Cooled air flows into a mixing chamber where it is mixed with an approximately equal amount of filtered air from the passenger cabin, then ducted and distributed via overhead louver outlets. Within the cabin 3, the airflow is generally circular and exits through floor grills on either side of the cabin 3 into the lower cargo portion of the fuselage. Generally, one half of the air from the cabin is exhausted through an overflow valve, which also controls cabin pressure and provides air changeover. The other half of the air is filtered and mixed with incoming compressed air from the engine. As shown in FIG. 3, the positioning of the under floor recessed housing 1 utilizes spent air flow that has exited from the cabin 3. Any heat exchanged to the air used for cooling the housing 1 is not directed towards passengers but rather is directed to the air makeup/exhaust/reconditioning portion of the conventional aircraft air circulation system.

Figure 5:
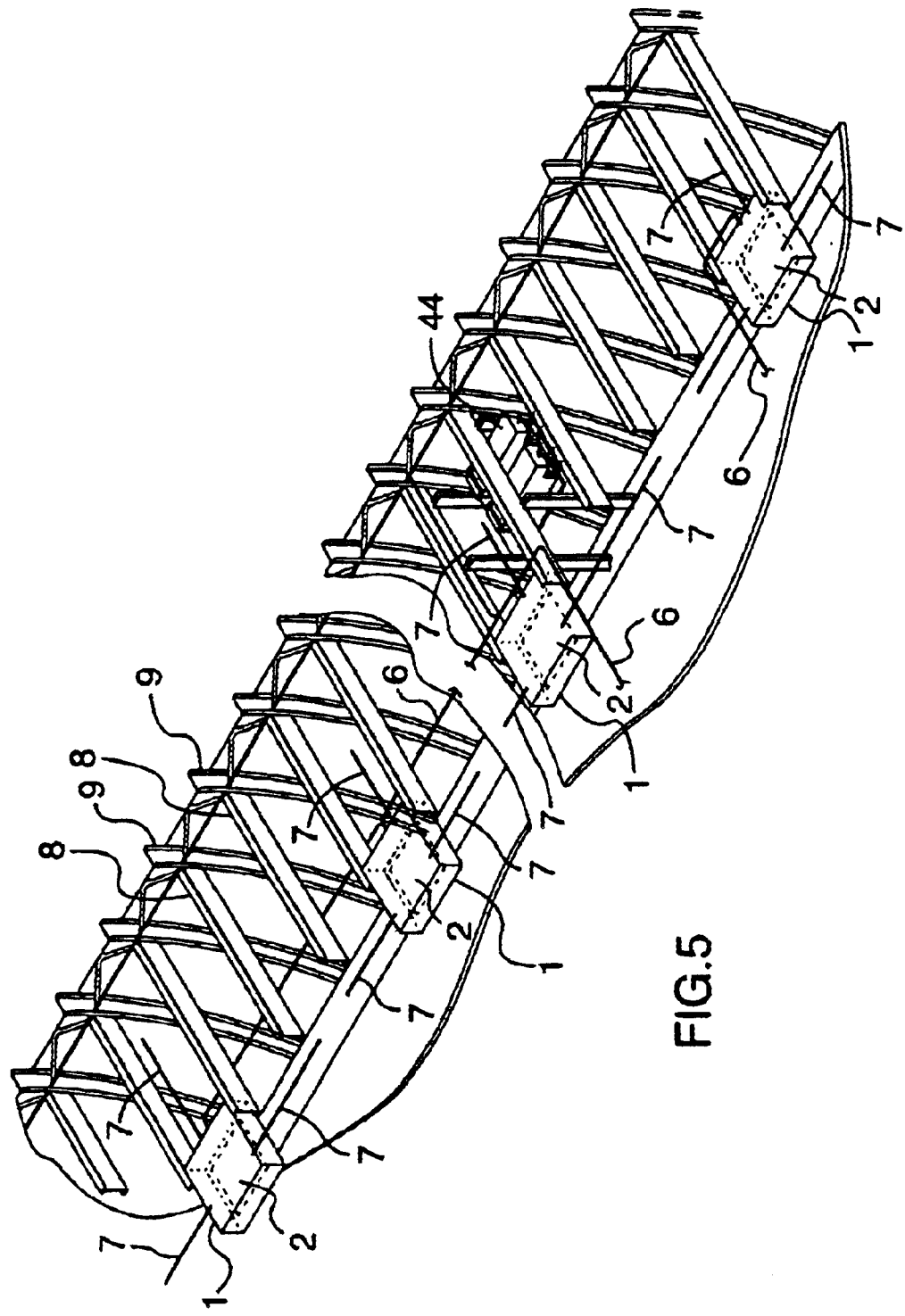
FIG. 5 is a partial perspective view of the aircraft floor structure with floor panels removed to show transverse floor beams and in particular to show an example of four individual under floor housings.
Figure 6:
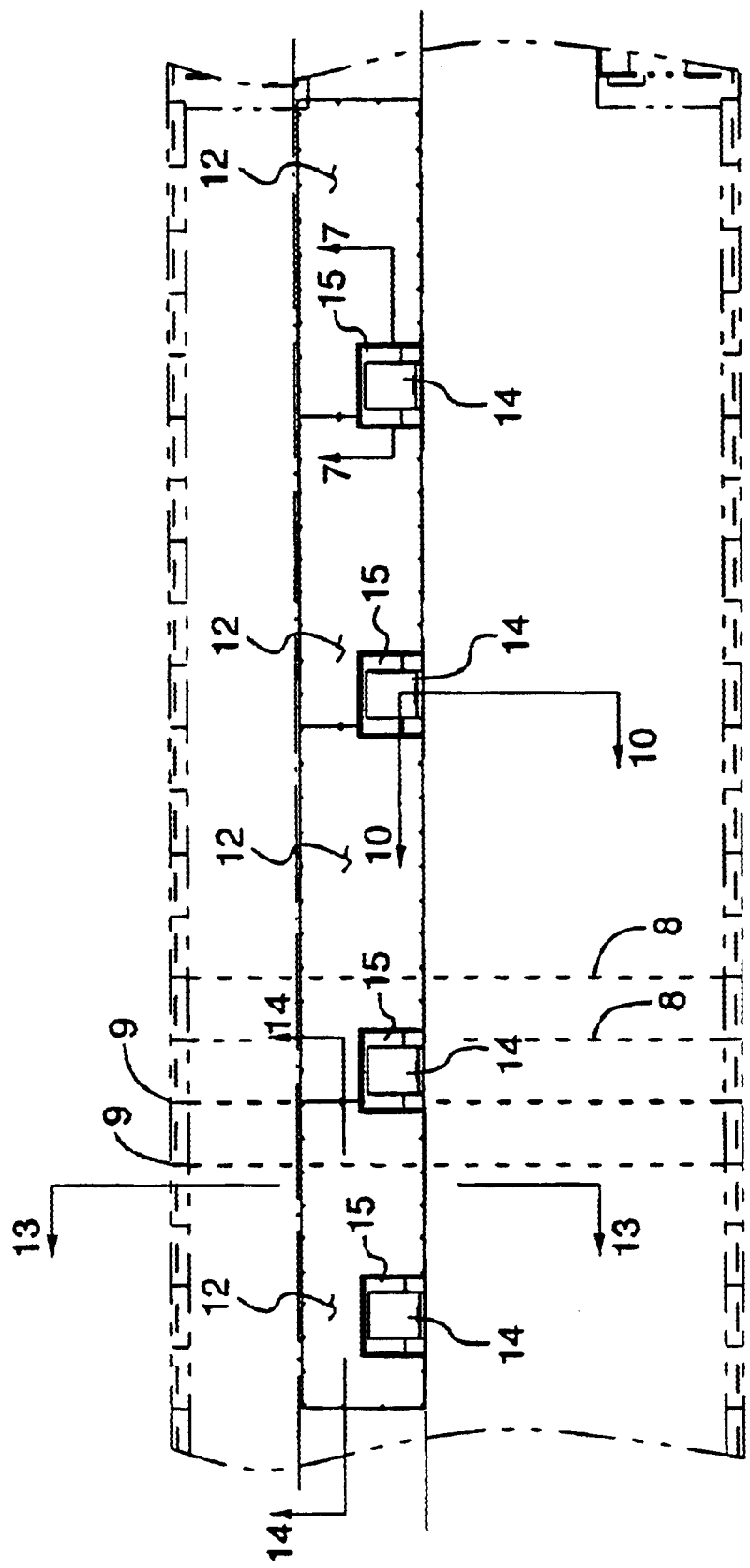
FIG. 6 is plan view of a portion of the passenger cabin floor (as in FIG. 5) with modified floor panels, removable too cover on four under floor housings and access cover frames surrounding the removable cover to support it on the existing transverse beams and provide support for adjacent floor panels.

FIG. 4 shows a floor plan of a conventional wide body aircraft with different seat arrangements in the forward first class/business class forward portion and closer seat pitch in the rearward economy class area. In both cases, individual passenger seat electronic units have been removed from their conventional locations under the seat units and relocated in clusters in recessed under floor housings 1. For simplicity of the description, FIGS. 5 and 6 show only a small portion of the cabin floor that includes four individual recessed housings 1 in the area indicated in FIG. 4 with dashed outline.

Therefore, according to the invention the under floor housing system provides for installation of remote cluster system for passenger seat services within the aircraft, preferably where the motherboard includes a separate dedicated circuit board for each passenger seat to provide: audio and video on demand; voice and data communications (cell phone, email, internet etc.) and AC/DC electric power for laptop computers and other personal electronics devices (CD players, DVD players, etc).

In general, the aircraft includes a passenger cabin 3 with a floor structure 4 supporting an array of passenger seats 5 either in individual units, or two to five seats 5 in a row array. Each individual seat unit or multiple seat units has seat legs secured within the seat tracks 11 longitudinally extending throughout the aircraft cabin floor 4.

The individual motherboards 2 in each are each connected to the aircraft electrical power system and a central audio/video/voice/data file server that serves as an aircraft passenger seat services unit via conduit 6 (shown in FIG. 5) and motherboards 2 communicate via cables 7 (shown in FIGS. 5, 15 and 16) through a passenger interface accessible from an associated passenger seat 5.

Figure 7:
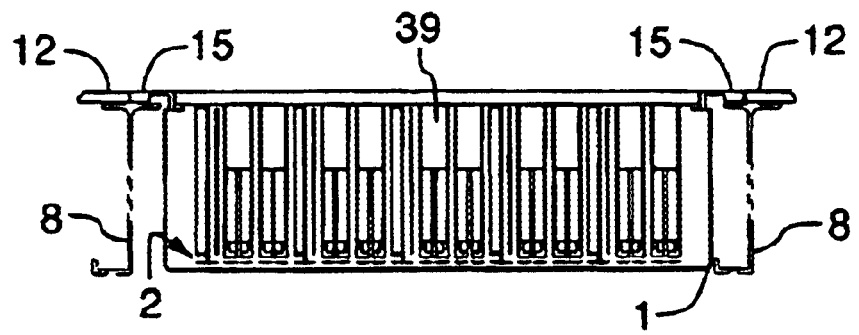
FIG. 7 is a sectional view through a housing, motherboard and circuit boards along line 7—7 of FIG. 6.
Figure 8:
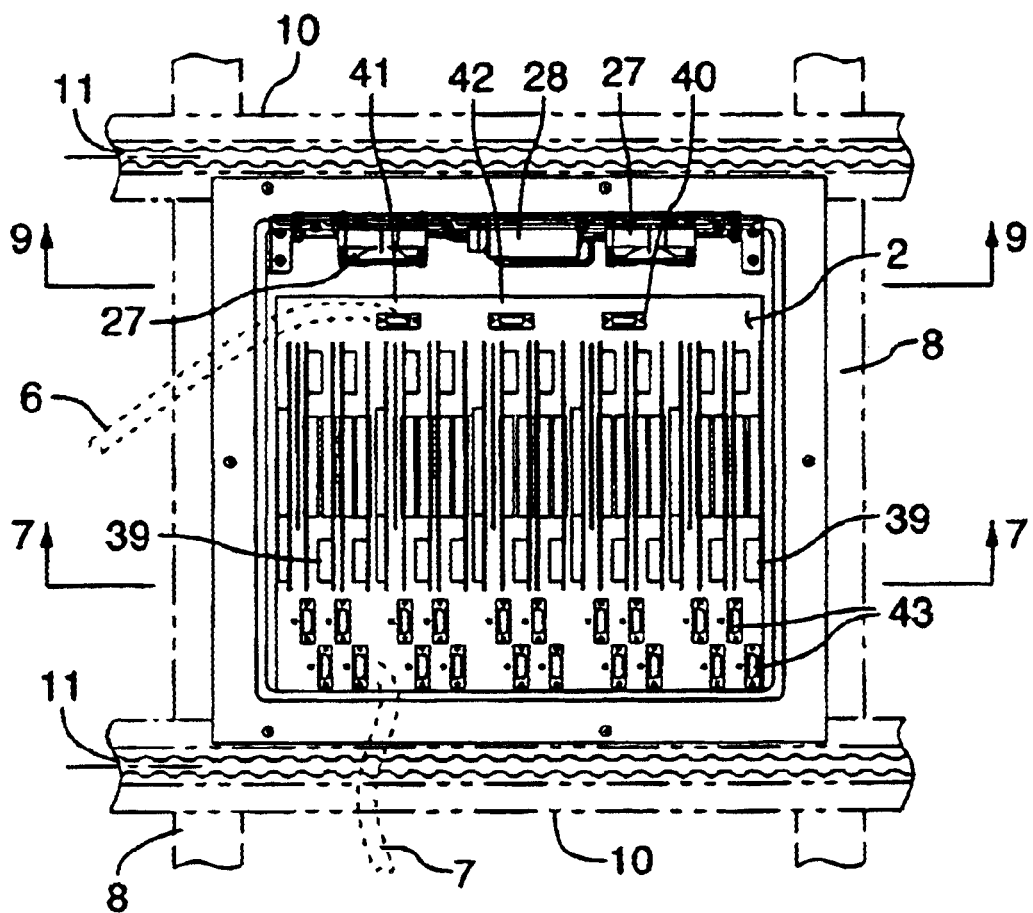
FIG. 8 is a plan view of the housing of FIG. 7 with installed cooling fans, motherboard and circuit boards, showing fitting of the housing between beams and joists with seat anchoring track in the cabin floor.

As seen in FIGS. 7–8 the individual housings 1 contain a motherboard 2 and several circuit boards 39 mounted in slots to form one component of a remote cluster system for providing the passenger seats 5 with passenger services within the aircraft cabin. The motherboard 2 has a 15 pin power input and output connection 40 in communication upstream with the aircraft electrical power source and downstream in a "daisy chain" with other motherboards 2 in the aircraft cabin floor. The motherboard 2 has a signal input connection 41 in communication with an aircraft passenger seat services unit, such as a file server or audio-video control centre. The motherboard 2 has a signal output connection 42 for connecting downstream in a "daisy chain" with other motherboards 2 in the aircraft cabin floor.

The motherboard 2 has a plurality of circuit board slots to house the twenty circuit boards 39 each in communication with the power input connection 40 and signal input connection 41, and twenty passenger seat output connectors 43, each output connector 43 communicating with at least one of the twenty circuit board slots.

The twenty circuit boards 39 are each removably engaged in an associated one of said circuit board slots of the motherboard 2, with a plurality of passenger seat service cables 7 communicating between a plurality of passenger seats 5 and the passenger seat output connectors 43. Each output connector includes an "online" LED indicator light to enable easy identification of faulty operations.

In the embodiment illustrated each of twenty passenger seats communicates with one of the twenty dedicated passenger seat output connectors 43, via one of twenty passenger seat service cables 7. Twenty dedicated circuit boards 39 in dedicated slots is each dedicated to only one of said passenger seats 5. However, the motherboard may have additional spare slots to add seats or services at a later date, or each circuit board 39 may serve multiple seats if desired. A local power source 44 (see FIG. 5) located external to or within the housing 1 communicates between the motherboards 2 and the main aircraft electrical power source.

As mentioned above and shown in FIGS. 7–8, the circuit boards 39, with twenty circuit boards 39 shown in the example, are removably inserted into slots in the motherboard 2, and each provide dedicated services to twenty passenger seats 5. For example, the twenty passenger seats 5 may be located in an economy section of the cabin where "basic" services are provided by a dedicated "passenger communications board" 39 with capability of communicating signals to the passenger seat controls and display such as: audio signals, i.e.: music, radio; video signals, i.e.: movies, television, flight video, closed circuit video; voice signals, i.e.: cellular phone, intercom etc.; and data signals, i.e.: email, internet access, etc.

In first class or business class sections of the cabin with power assisted adjustable or reclining seats, additional passenger services may be included by providing a motherboard 2 with slots to accommodate additional "seat operation" circuit boards 39 to communicate seat control signals and provide electrical power for seat movement and sensing operations. The seat operation circuit boards 39 communicate via the passenger seat service cables 7, preferably a serial bus, to various passenger seat modules such as: seat positioning actuators; position sensors; heat sensors; load cells; inflatable cushions; heaters; vibrators; and position limit switches. Of course, the basic passenger communication board 39 for each first class or business class seat can be specially designed to include the same "seat operation" functions if desired.

Further, in economy, first class or business class sections of the cabin electric power outlets for laptop power or powering personal electronic devices may be included by providing a motherboard 2 with slots to accommodate additional "power supply" circuit boards 39 to communicate electrical power to the passenger seat 5. The power supply circuit boards 39 communicate via the passenger seat service cables 7, preferably a serial bus, to passenger seat power outlets such as: 115 Volt AC power outlets; DC power outlets; laptop power outlets; and personal electronic device outlets. Of course, the basic passenger communication board 39 for each first class or business class seat can be specially designed to include the same "power supply" functions if desired.

By merely interchanging the circuit boards 39, an airline can quickly reconfigure the passenger services provided to a block of seats 5 in the cabin. For example, for charter flights, the level of service may be reduced by physically replacing the circuit boards 39 or by programming changes to block access to some services. Further, for long intercontinental flights the airline may wish to add more services by changing the circuit boards 39.

Figure 9:
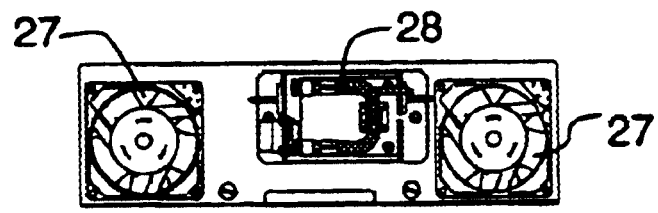
FIG. 9 is an elevation view of the fans for cooling the recessed housing, along line 9—9 of FIG. 8.

According to the invention, the under floor housing system includes a number of individual air cooled housings 1 recessed beneath the floor surface 4 adjacent to the passenger seats 5 for example as shown in FIG. 4. As seen in FIGS. 7–9, the circuit boards 39 are aligned with the air flow direction of the fans 27 to define one way air flow channels through the housing 1.

As indicated in FIGS. 5, 13, 14, 15 and 16, the floor 4 is built up from a series of spaced apart transverse floor beams 8 that span across oval hoops 9 to form the structural frame work for the aircraft fuselage. The floor beam 8 arrangement is best seen in the FIG. 5 perspective view. As also shown in the perspective view of FIG. 15, the extruded aluminium alloy transverse beams 8 in turn support longitudinal joists 10 that are extruded aluminium sections including a seat track 11 in the top flange of the joist 10. The top flange of the beams 8 and joists 10 are assembled in a common plane to provide a flat rectangular grillwork into which individual floor panels 12 are removably secured with countersunk bolts 13 (as best seen for example in the sectional views of FIGS. 13 and 14).

FIG. 6 shows installation of four air cooled recessed housings 1 in an example arrangement where the rectangular floor board units are removable. Floor panels 12 that have square cut outs to accommodate the recessed housing 1 and the associated access cover frame 15 surrounding the removable top cover 14, the details of which are described below.

Therefore the under floor cluster system includes a motherboard 2 and circuit boards 39 within the recessed housing 1, input signal and electrical power are provided to the system via cables 6 and output cables 7 are installed through recessed raceways 30 (see FIGS. 15, 16) between the recessed housing 1 and each individual passenger seat 5.

The fans 27 intake air flow that has exited from the passenger cabin 3 (as indicated with arrows in FIG. 1) through side wall air louvers directing air into the under floor compartment. Air from the fans 27 continues the flow pattern of the passenger cabin air circulation system and is not directed into the passenger cabin 3, but continues with the spent airflow to be exhausted or mixed with fresh intake air from the engine compressors after filtering and heat exchange.

The housing 1 includes a temperature and fan rotation sensor 28 that is also in communication with the master control for the electronic units 2. Cabin crew is alerted by means of alarms or a display when there is a fan malfunction (where a fan ceases to rotate) or when the temperature in the housing 1 exceeds the desired operating range. Cabin crew can operate a master control to shut down any malfunctioning or overheating electronic units 2 within the housing 1. The fans 27 are an efficient means of cooling the housings 1 with existing cool air flow however it is possible to include electrically powered air conditioning units within the housings 1 as well if necessary since space restrictions and noise control are less problematic outside the passenger cabin area.

Figure 10:
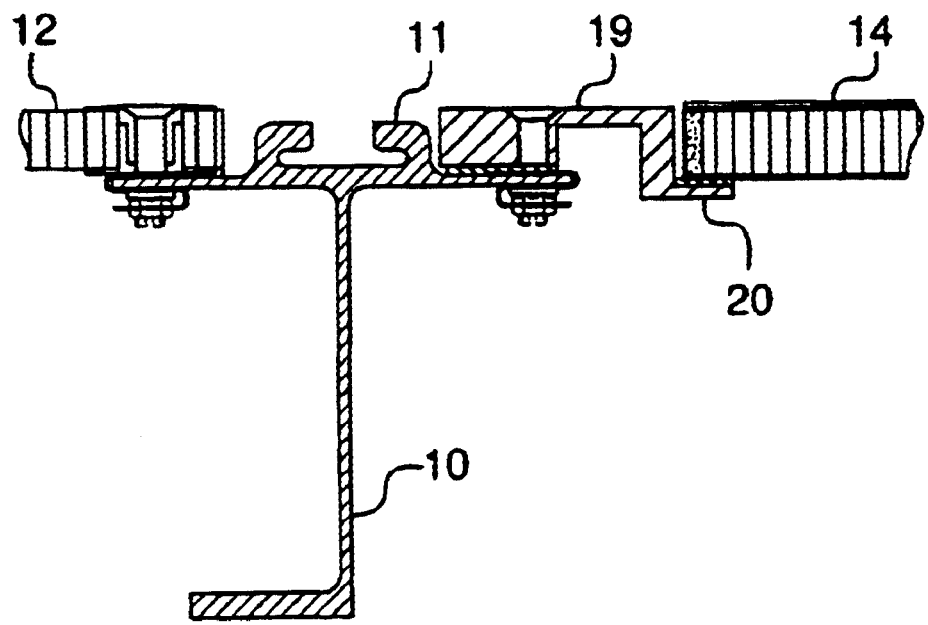
FIG. 10 is a sectional view, along line 10—10 of FIG. 6, showing the cover frame and cover over the housing.
Figure 11:
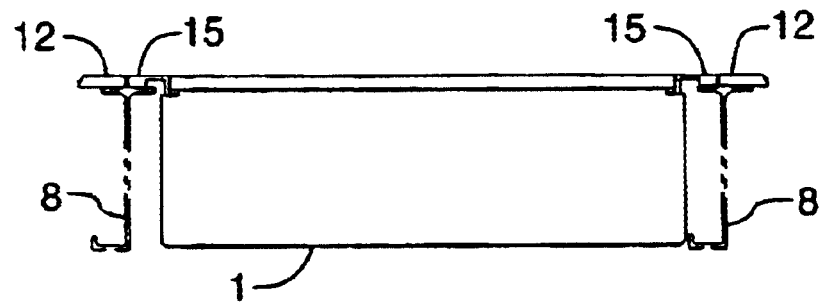
FIG. 11 is a sectional view similar to FIG. 7 showing the housing without the motherboard and circuit boards installed.
Figure 12:
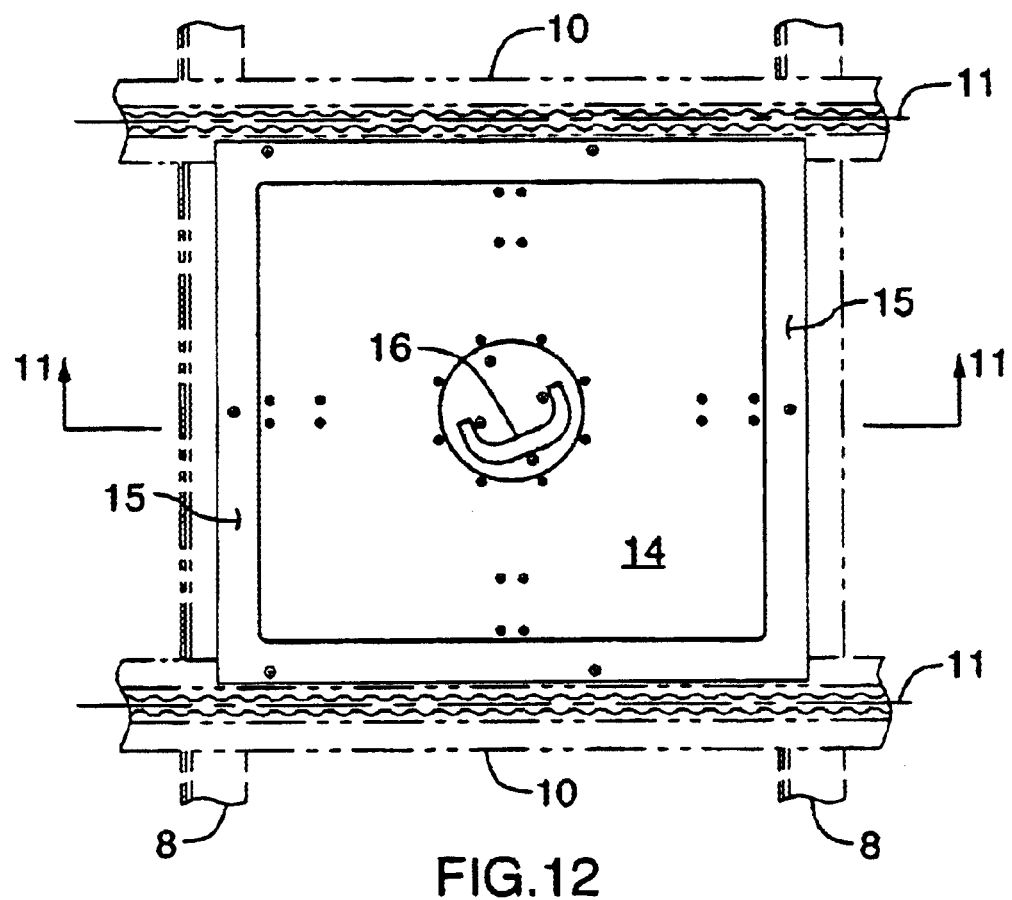
FIG. 12 is a plan view of the housing with cover installed in the cover frame with central lift handle.
Figure 13:
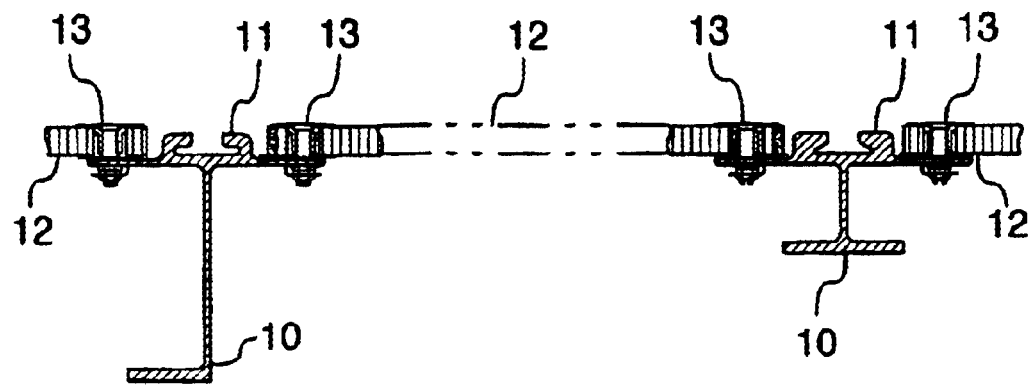
FIG. 13 is a sectional view, along line 13—13 of FIG. 6, showing a section view through the floor panel, which is bolted to the top flange of the adjacent longitudinal floor moist with removable countersunk bolts.
Figure 14:
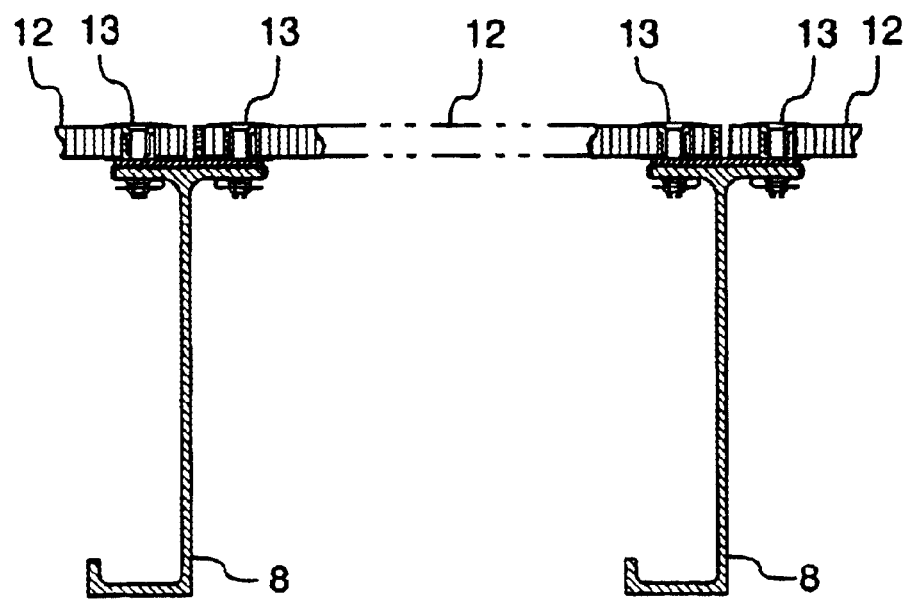
FIG. 14 is a like sectional view, along section lines 14—14 of FIG. 6, showing sectional view through the floor panel bolted to top flange of two adjacent transverse floor beams. It will be apparent that the floor beams and joists need never be altered since all floor panel modifications use existing bolt holes and under floor housings are hung from unaltered beam flanges. Any modification to the beams or joists (drilling, welding or added bolts etc.) would impede acceptance of the system described herein since any alterations to the airframe structure undergo close design scrutiny for safety and equipment duty life issues.

As shown in FIGS. 10, 11 and 12, the sheet metal structure of the housing 1 is easily dropped into place supported on the beams 8 from overhead on laterally extending beam flanges. As shown in FIG. 7 the housing can be formed of relatively lightweight thin sheet metal and extends down from the bottom edge of the cover frame 15.

Figure 15:
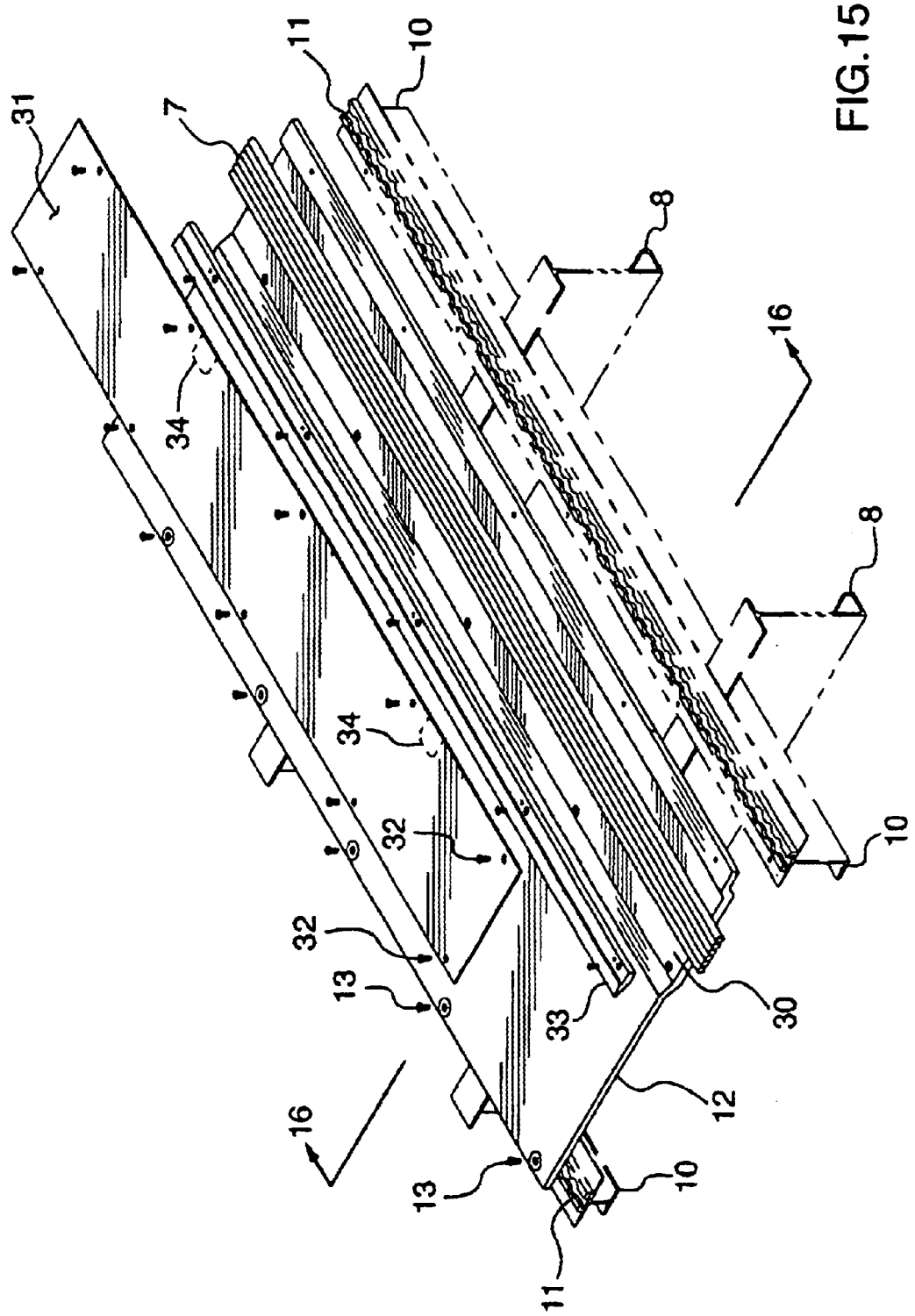
FIG. 15 is an exploded perspective view of a floor panel that includes a recessed cable raceway with removable cap plate for providing a cable raceway between the recessed housing and individual passenger seats units which are secured to the seat track.
Figure 16:
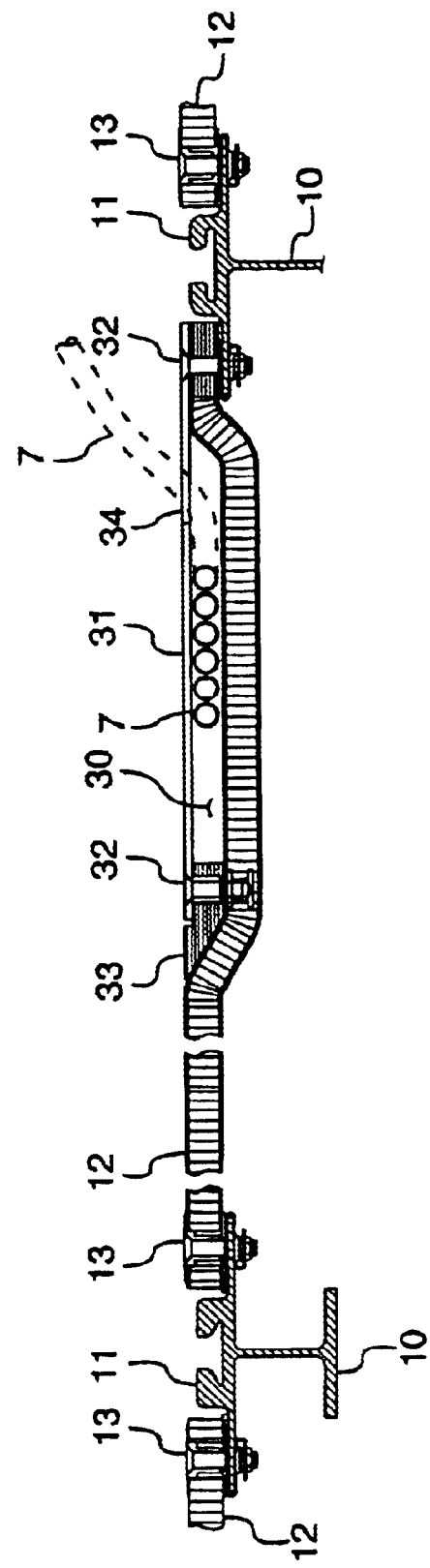
FIG. 16 is a detailed sectional view along line 16—16 of FIG. 15 showing in dashed outline the means by which the top cap plate can be notched or cut open to permit passage of cables to individual seats units at any point along the length of the raceway.

Conventionally floor mounted wires and cables are positioned inside a plastic raceway which is located under a plastic seat track cover strip (not shown) that covers the seat tracks 11 and protrudes upwardly from the carpeted cabin floor surface. As shown in FIGS. 15 and 16, the invention preferably includes modified floor panels 12 that have a recessed conduit raceway 30 disposed adjacent to the seat track 11. A removable cap plate 31 is secured with bolts 32 and a filler strip 33. As best seen in FIG. 16, the cap plate 31 and adjacent floor panels 12 have flush top surfaces thereby avoiding the discontinuous surface common in conventional aircraft cabin floors. Carpet may be applied over the floor panels 12, cap plate 31 and if desired over open portions of the seat track 11 to provide a completely flat continuous floor surface without obstruction or visual discontinuity.

As indicated in FIG. 5, cables 7 extend from the motherboards 2 to each passenger seat 5. In order to pass from the recessed raceway 30 to the passenger seat 5 mounted with legs in the seat track 11, the cap plate 31 includes a lateral opening 34. The opening 34 can be cut easily in the thin sheet metal cap plate 31 with a jigsaw or pre-punched knock out openings or notches 34 can be provided. Since the cap plate 31 is a simple flat plate with drilled holes, it can be treated as a recyclable item that can be replaced if the seat pitch on the aircraft is repeatedly changed and numerous openings 34 are made in the cap plate 31.

Figure 17:
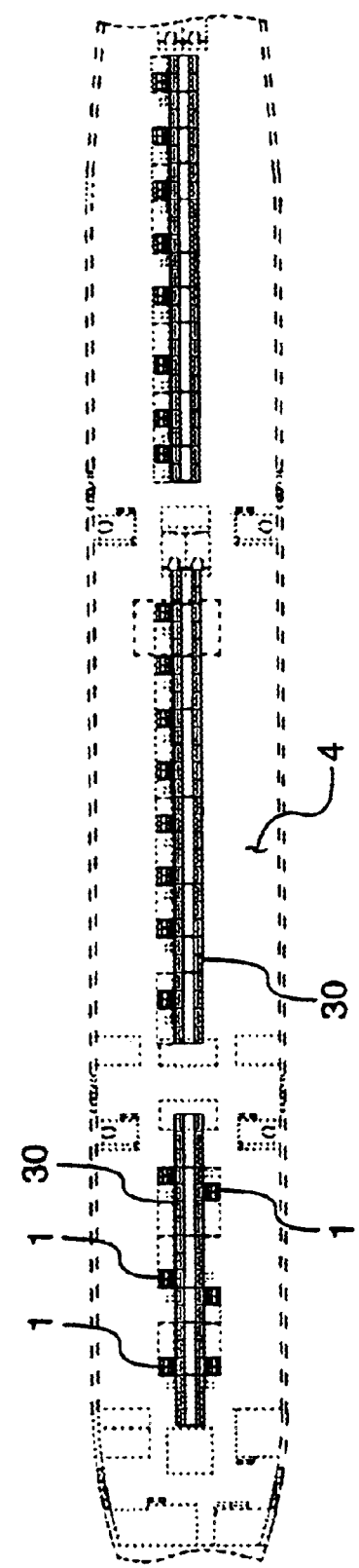

It will be appreciated that the invention can be adapted to various cabin floor plans or aircraft configurations. FIG. 17 demonstrates an alternative configuration showing two longitudinal raceways 30 with recessed housings 1 laterally positioned branching off from the raceways 30 with floor panels 12 within the cabin floor 4 attached to the top flanges of transverse floor beams 8 and floor joists 10 with removable bolts.

A significant advantage of the invention is that existing floor panels 12 can be removed and modified without requiring any modification to the beams 8 or joists 10. Modification to these structural components will require approval by the proper authorities. However, the invention relates to floor panels 12 that are removably attached with bolts and the strength of the floor panels 12 is maintained.

Figure 20:
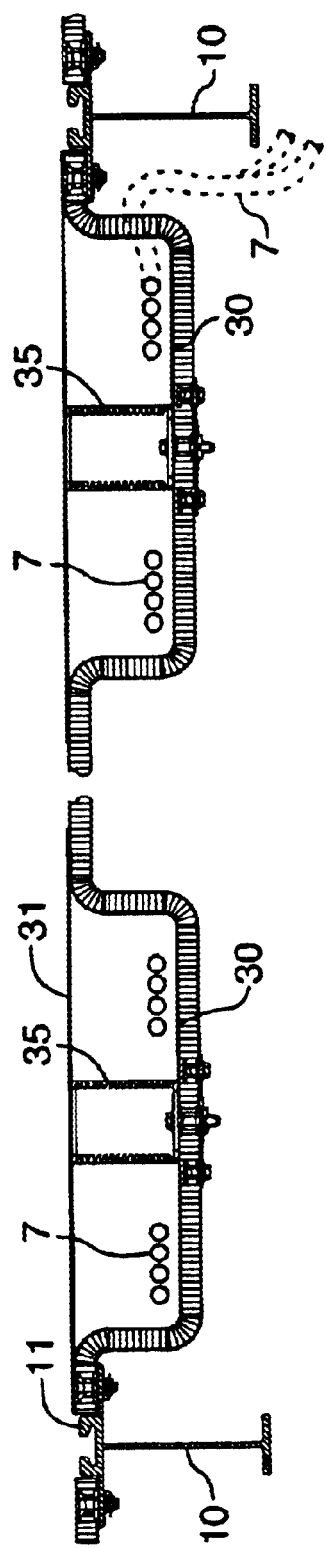

As shown in FIGS. 18 and 19, two parallel longitudinal cable raceways 30 are provided between the seat tracks 11 and serve to house the cables 7 as shown for example in FIGS. 20, 21 and 22. In the area between the floor beams 8, as shown in FIG. 19, the raceway 30 is relatively deep. In these areas, a support bracket 3S, best seen in FIGS. 20 and 21, is provided to support to cap plate 31 and is attached thereto with bolts 36. In the area extending over the floor beams 8 however, the raceway 30 is significantly shallower as shown in FIG. 22, but remains sufficient for housing the cables 7 with a spacer block 37 to support the cap plate 31. The cables 7 pass through the raceway 30 and connect laterally to the motherboards 2 (not shown) housed within the recessed housing 1.

As shown in FIG. 18 optional cut-out panels 38 can be provided in a relatively low stress area of the central portion of the cap plate 31 attached with bolts 36 to provide access for routing the cables 7 to the passenger seats 5 and for providing access to the raceway 30 at periodic locations where necessary. An important feature of this alternative raceway 30 is that as shown in FIG. 22 the raceway 30 is very shallow when it passes over the floor beams 8 thereby eliminating any need to modify the floor beams 8. Further the cut out panels 38 provided in the relatively low stress central portion of the cap plate 31 maintain the diaphragm strength of the floor panel 12 which reinforces the beam 8 and joist 10 floor support structure.

Although the above description relates to a specific preferred embodiment as presently contemplated by the inventor, it will be understood that the invention in its broad aspect includes mechanical and functional equivalents of the elements described herein.

I claim:

1. A remote cluster system for providing a plurality of passenger seats with passenger services within an aircraft, the aircraft having a passenger cabin with a floor supporting the plurality of passenger seats, the cluster system comprising:
   a motherboard, having:
      a power input connection in communication with an aircraft electrical power source;
      a signal input connection in communication with an aircraft passenger seat services unit;
      a plurality of circuit board slots in communication with the power input connection and signal input connection; and
      a plurality of passenger seat output connectors, each output connector communicating with at least one of said circuit board slots;
   the cluster system further comprising:
      a plurality of circuit boards, each removably engaged in an associated one of said circuit board slots of the motherboard; and
      a plurality of passenger seat service cables communicating between a plurality of passenger seats and said passenger seat output connectors;
   wherein each passenger seat communicates with a dedicated one of the circuit boards in a dedicated slot via a dedicated one of each of the output connectors and service cables.

2. A remote cluster system according to claim 1 including a local power source communicating between the motherboard and the aircraft electrical power source.

3. A remote cluster system according to claim 1 wherein the motherboard includes signal output connection means, comprising a signal output connector in communication with the signal input connector, for communicating with a downstream motherboard.

4. A remote cluster system according to claim 1 wherein the motherboard includes power output connection means, comprising a power output connector in communication with the power input connector, for communicating with a downstream motherboard.

5. A remote cluster system according to claim 1 wherein the circuit board comprises a passenger communication board communicating signals selected from the group consisting of: audio signals; video signals; voice signals; and data signals.

6. A remote cluster system according to claim 1 wherein the circuit board comprises a seat operation board communicating seat control signals and seat operation electrical power, via said passenger seat service cables, to a plurality of passenger seat modules selected from the group consisting of: positioning actuators; position sensors; heat sensors; load cells; inflatable cushions; heaters; vibrators; and limit switches.

7. A remote cluster system according to claim 1 wherein the passenger seat service cables comprises a serial bus connected to a plurality of passenger seat modules.

8. A remote cluster system according to claim 1 wherein the circuit board comprises a power supply board communicating electrical power, via said passenger seat service cables, to a plurality of passenger seat power supply outlets selected from the group consisting of: 115 Volt AC power outlets; DC power outlets; laptop power outlets; and personal electronic device outlets.

9. A remote cluster system according to claim 1 comprising: at least one housing, about the motherboard and circuit boards, recessed beneath the aircraft passenger cabin floor surface adjacent the passenger seats, each housing having: a removable top cover; side walls; and a bottom wall defining an interior compartment.

10. A remote cluster system according to claim 9 comprising: air cooling means, for cooling each motherboard within the interior compartment of each housing, the air cooling means comprising a fan with an intake and outlet in communication with a passenger cabin air circulation system.

11. A remote cluster system according to claim 9 wherein each housing includes a temperature sensor in communication with a master control.

12. A remote cluster system according to claim 10 wherein each housing includes a fan rotation sensor in communication with a master control.

13. A remote cluster system according to claim 10 wherein the circuit boards are disposed in alignment with an air flow direction of the fan defining one way air flow channels through the housing compartment.

14. A remote cluster system according to claim 9, wherein the aircraft cabin floor comprises: a plurality of spaced apart transverse floor beams with a top beam flange: a plurality of longitudinal joists supported by the transverse floor beams, each joist having a seat support track in a top joist flange thereof; and a plurality of floor panels mounted to at least one of the flanges; the housing including a laterally extending cover frame mounted to the flanges.

15. A remote cluster system according to claim 14 including: a conduit raceway beneath a top surface of the floor panels and disposed adjacent a seat track, the raceway having a removable cap plate.

16. A remote cluster system according to claim 15, wherein the cap plate and adjacent floor panels have a flush top surface.

17. A remote cluster system for providing a plurality of passenger seats with passenger services within an aircraft, the aircraft having a passenger cabin with a floor supporting the plurality of passenger seats, the cluster system comprising:
- a motherboard, having:
  - a power input connection in communication with an aircraft electrical power source;
  - a signal input connection in communication with an aircraft passenger seat services unit;
  - a plurality of circuit board slots in communication with the power input connection and signal input connection; and
  - a plurality of passenger seat output connectors, each output connector communicating with at least one of said circuit board slots;
- the cluster system further comprising:
  - a plurality of circuit boards, each removably engaged in an associated one of said circuit board slots of the motherboard; and
  - a plurality of passenger seat service cables communicating between a plurality of passenger seats and said passenger seat output connectors;
- at least one housing, about the motherboard and circuit boards, recessed beneath the aircraft passenger cabin floor surface adjacent the passenger seats, each housing having:
  - a removable top cover;
  - side walls; and,
  - a bottom wall defining an interior compartment;
- wherein the aircraft cabin floor comprises: a plurality of spaced apart transverse floor beams with a top beam flange; a plurality of longitudinal joists supported by the transverse floor beams, each joist having a seat support track in a top joist flange thereof; and, a plurality of floor panels mounted to at least one of the flanges; the housing including a laterally extending cover frame mounted to the flanges.

18. A remote cluster system according to claim 17 including: a conduit raceway beneath a top surface of the floor panels and disposed adjacent a seat track, the raceway having a removable cap plate.

19. A remote cluster system according to claim 18, wherein the cap plate and adjacent floor panels have a flush top surface.

20. A remote cluster system according to claim 17 wherein each passenger seat communicates with a dedicated passenger seat output connector, via one of said passenger seat service cables.

21. A remote cluster system according to claim 20 including dedicated circuit boards in dedicated slots each dedicated to only one of said passenger seats.

22. A remote cluster system according to claim 17 including a local power source communicating between the motherboard and the aircraft electrical power source.

23. A remote cluster system according to claim 17 wherein the motherboard includes signal output connection means, comprising a signal output connector in communication with the signal input connector, for communicating with a downstream motherboard.

24. A remote cluster system according to claim 17 wherein the motherboard includes power output connection means, comprising a power output connector in communication with the power input connector, for communicating with a downstream motherboard.

25. A remote cluster system according to claim 17 wherein the circuit board comprises a passenger communication board communicating signals selected from the group consisting of: audio signals; video signals; voice signals; and data signals.

26. A remote cluster system according to claim 17 wherein the circuit board comprises a seat operation board communicating seat control signals and seat operation electrical power, via said passenger seat service cables, to a plurality of passenger seat modules selected from the group consisting of: positioning actuators; position sensors; heat sensors; load cells; inflatable cushions; heaters; vibrators; and limit switches.

27. A remote cluster system according to claim 17 wherein the passenger seat service cables comprises a serial bus connected to a plurality of passenger seat modules.

28. A remote cluster system according to claim 17 wherein the circuit board comprises a power supply board communicating electrical power, via said passenger seat service cables, to a plurality of passenger seat power supply outlets selected from the group consisting of: 115 Volt AC power outlets; DC power outlets; laptop power outlets; and personal electronic device outlets.

29. A remote cluster system according to claim 17 comprising: air cooling means, for cooling each motherboard within the interior compartment of each housing, the air cooling means comprising a fan with an intake and outlet in communication with a passenger cabin air circulation system.

30. A remote cluster system according to claim 17 wherein each housing includes a temperature sensor in communication with a master control.

31. A remote cluster system according to claim 29 wherein each housing includes a fan rotation sensor in communication with a master control.

32. A remote cluster system according to claim 29 wherein the circuit boards are disposed in alignment with an air flow direction of the fan defining one way air flow channels through the housing compartment.

* * * * *